United States Patent Office 3,466,451
Patented Sept. 9, 1969

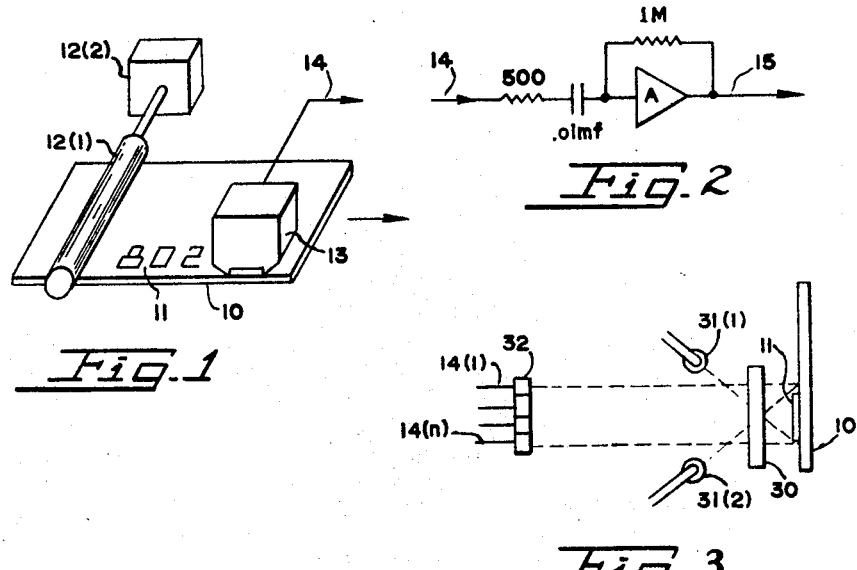

3,466,451
PHOTOELECTRIC DEVICE FOR SENSING INDICIA
ON A MOVING MEDIUM
Leland J. Hanchett, Jr., Glendale, Ariz., assignor to
General Electric Company, a corporation of New York
Filed May 31, 1966, Ser. No. 553,831
Int. Cl. G01n 21/30
U.S. Cl. 250—219                                    2 Claims

ABSTRACT OF THE DISCLOSURE

A device for sensing indicia comprising a housing block, a central light passage, a first chamber containing a lens located at the end of the central passage, two adjacent chambers one on each side of the light passage, at acute angles to it, each chamber containing a light source for illuminating the lens when the device is in operation. The lens being used for both focusing light onto the document being read and for focusing reflected light from the document.

This invention relates to record reading devices and more specifically to a simple, small sized, low cost device for optically sensing or scanning symbols formed in contrasting reflectivity on a moving medium.

In a typical optical scanning arrangement, relative motion is provided between the medium bearing the symbols and an illuminated slit. A light sensitive device, such as a photocell, receives light reflected from or transmitted through the slit area and produces a signal having a waveshape characteristic of the scanned symbol. (The thus produced symbol waveshapes may then be applied to recognition circuitry or other utilization apparatus.)

Many optical scanning devices are now known, including the following:

An optical scanning arrangement for use in telegraph transmitting apparatus is shown by L. M. Potts in U.S. Patent No. 2,565,266.

An optical scanning arrangement for use in a system for translating indicia into acoustical energy is shown by V. K. Zworykin et al., in U.S. Patent No. 2,616,983.

An optical scanner for use in a character reader is described by E. C. Greanias at pages 134–136 of Optical Character Recognition, Spartan Books, 1962.

Such prior scanning devices have been characterized by excessive bulk and complication. High power light sources for illumination of the medium were required. Typically one or more 500 watt projection lamps were used with consequent problems of lamp mounting, lamp life and heat dissipation. Complicated and costly optical systems were required to direct the light onto the document and to magnify and project the symbol image onto the light sensitive devices. Such systems, in addition to bulkiness, require careful alignment for proper operation.

It is an object of the invention to provide an optical scanner of small size and low cost.

A more specific object of the invention is to provide an optical scanning device using a single lens for directing the light from low power light sources onto a document and for focusing the light reflected from the document onto a light sensitive element.

These and other objects of the invention are achieved by providing a single lens, having at least one cylindrical surface, for both focusing light onto the document and focusing light which is reflected from the document onto a photocell or other light sensitive element. The lens advantageously may be a simple, inexpensive fully cylindrical lens of small diameter.

The lens is positioned closely adjacent the moving document with the longitudinal axis of the lens perpendicular to the direction of motion of the document. One or more light sources are positioned on the side of the lens opposite the document whereby the lens focuses light from the sources onto said document in a narrow transverse line. A light sensitive element is also positioned on the side of the lens opposite the document, preferably along a line perpendicular to the axis of the lens, whereby light reflected from the document is focused by the lens onto the light sensitive element. The light sources may be placed at an angle with respect to the axis of the lens to avoid interference with the path of the reflected light directed onto the light sensitive element.

Thus the scanning device of the invention requires only a single, simple, inexpensive lens of small size and the light sources may be of relatively low power because they may be placed very close to the document and because the light is efficiently focused by the lens in a very narrow line onto the document.

Further features and a more specific description of a preferred embodiment of the invention are presented hereinafter with reference to the accompanying drawing wherein:

FIGURE 1 illustrates a general arrangement of a document transport and scanning device;

FIGURE 2 is a schematic diagram of a differentiating circuit which may be used to convert the signal from the optical scanner to a form compatible with a known recognition circuit;

FIGURE 3 is a sketch showing the general arrangement of the basic elements of the optical scanning device of the invention; and FIGURE 4 is a perspective view, partly in longitudinal cross section, illustrating a preferred embodiment of the optical scanning device of the invention.

Illustrated in FIG. 1 is a medium in the form of a document 10 bearing a series of symbols 11 printed with ink or other material having contrasting light reflectivity with respect to the document surface. The symbols 11 may be any optically distinguishable identifying marks or indicia. For example, they may be formed according to a system of human language symbols especially designed for machine reading. (Such a system of symbols is shown, for example, by R. E. Milford in FIG. 6 of U.S. Patent No. 3,112,469.)

For scanning of the symbols 11, the document 10 is moved to the right, as indicated in FIG. 1, by well-known transport mechanism including a drive roller 12(1) driven by, for example, a drive motor 12(2). The symbols 11 are thus moved past an optical scanner 13 which senses the light reflected from a narrow line across the document to thus produce signals on a lead 14 which are a function of the amount of light reflected from the document and the symbols carried thereby. If the symbols 11 are designed for machine reading, as suggested above, a uniquely different waveshape is produced on lead 14 for each different symbol that is scanned.

Many systems have been proposed for recognizing each of a plurality of waveshapes. For example, a Waveshape Recognition System is disclosed by William H. Davidow et al., in copending U.S. patent application Ser. No. 401,-937, filed Oct. 6, 1964, and assigned to the assignee of the present invention now abandoned. If the waveshape signals on lead 14 are applied to a differentiating circuit, for example as shown in FIG. 2, the resulting differentiated waveshapes on a lead 15 may be applied to the delay line of application Ser. No. 401,937 for recognition thereof by the recognition system therein disclosed.

The principal elements and the mode of operation of the scanning device of the invention are illustrated in FIG. 3. The document 10, bearing the symbols 11, is shown in end view. A cylindrical lens 30 is positioned closely adjacent the document 10 with the longitudinal axis of the lens substantially parallel to the surface of the document and substantially perpendicular to the direction of travel of the document. One or more light sources, such as a pair of lamps 31(1) and 31(2), are positioned so that light therefrom is focused by the lens 30 in a narrow vertical line onto the surface of the document 10.

Light directed onto the document 10 by lens 30 is reflected from the document in proportion to the printed areas and this reflected light is focused by the same lens 30 onto a light sensitive element 32 positioned along a line substantially perpendicular to the surface of document 10 and intersecting the axis of the lens 30.

For some applications it may be desirable to provide multichannel scanning. This readily may be accomplished by vertically segmenting the light sensitive element 32, as shown in FIG. 3, to provide multichannel signals on a plurality of signal lines 14(1)–14($n$). Single channel scan can be provided by the segmented light sensitive element 32 by simply connecting the lines 14(1)–14($n$) in parallel. In this way, the document 10 is effectively horizontally scanned by the narrow vertical line of light and the light sensitive element thereby produces a waveshape signal that is a function of the amount of light reflected from the surface of the document.

A practical construction of an embodiment of the invention is shown in FIG. 4 wherein a housing block 40 is shown in longitudinal cross section. A cylindrical lens 41 is fitted into a recess in the righthand end of the block 40. A transparent window 42 is fitted over the righthand end of the block 40 to provide appropriate spacing of the document from the lens and to provide a protective sliding surface for the moving documents.

Formed in the block 40 is a central passage 43. Fitted into the lefthand end of this passage is an opaque apertured member 44, the aperture therein being in the form of a narrow vertical slit 45 positioned substantially parallel to the axis of the cylindrical lens 41. Mounted behind the slit 45 is a light sensitive element 32'. Thus light reflected from a document is focused by the lens 41 through the passage 43 and through the slit 45 onto the light sensitive element 32'.

The righthand end of passage 43 communicates with a chamber 47, the righthand side of chamber 47 being formed with a narrow vertical opening 48 for passage of light to and from the lens 41.

To provide illumination of the document, a pair of lamps 49(1) and 49(2) are fitted into a corresponding pair of obliquely formed chambers 50(1) and 50(2), the latter communicating with the chamber 47 so that light from the lamps 49(1) and 49(2) is directed through the opening 48 and is focused by the cylindrical lens 41 through the transparent window 42 in a narrow line onto a document passing over the window 42.

In one practical embodiment of the optical scanning device of the invention the overall dimensions of the housing block 40 were 1¾ inches long, 1¼ inches wide, and 1⅜ inches high. The lens 41 was formed of optical glass with a diameter of 0.125 inch. The window 42 was formed of synthetic sapphire with a thickness of 0.058 inch. The distance from the axis of the lens 41 to the surface of the light sensitive element 46 was about $1\tfrac{15}{32}$ inches. The lamps 47(1) and 47(2) were 1 watt each of the prefocused type. The slit 45 had a length of 0.375 inch and a width of 0.020 inch.

With this arrangement the magnification of the image of the document as projected by lens 41 onto the member 44 was in the order of 16. This provides an effective width of the slit 45 at the surface of the document of about 0.00125 inch.

Where the light sensitive element 32' is segmented to provide multiple channels, as discussed in connection with FIG. 3, the central passage 43 advantageously may be provided with vertically spaced partitions (not shown) to separate the light from the lens 41 into the respective channels.

Thus what has been described is an optical scanning device of small size and low cost using a single, simple lens for both focusing the source light onto the document and for focusing the reflected light onto a light sensitive element. In addition, only low power light sources are required and alignment adjustments are avoided. Furthermore, as may be seen from FIG. 4, the unit may be completely sealed to exclude dust and other foreign matter.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. A device for sensing indicia on a moving medium comprising the combination of: a housing block formed with an elongated light passage centrally arranged in said housing; a first chamber formed at one end of said passage; a cylindrical lens; a recess at the end of said block adjacent said chamber for receiving said lens; an elongated narrow opening between said chamber and said recess to allow passage of light to and from said lens; a transparent window positioned over the end of said block adjacent said lens; means for moving said medium past said window; a pair of chambers formed in said housing block one on each side of said light passage and each aranged at an acute angle with respect to said passage; a light source one arranged in each of said pair of chambers, said pair of chambers communicating with said first chamber so that light from each source is focused by said lens onto said medium; and a light sensitive element positioned at the other end of said light passage so that light reflected from said medium is focused by said lens onto said light sensitive element.

2. The combination defined by claim 1 further including an opaque member positioned in said light passage between said lens and said light sensitive element, said member having formed therein a narrow elongated slit substantially parallel to the longitudinal surface of said lens.

References Cited

UNITED STATES PATENTS

| 2,994,779 | 8/1961 | Brovillette | 250—200 |
| Re. 25,258 | 10/1962 | Asten | 250—239 |

RICHARD MURRAY, Primary Examiner

B. LEIBOWITZ, Assistant Examiner

U.S. Cl. X.R.

178—7.1, 7.6